(12) United States Patent
Uchimura et al.

(10) Patent No.: US 8,464,818 B2
(45) Date of Patent: Jun. 18, 2013

(54) FUEL SYSTEM AND VEHICLE

(75) Inventors: Chihiro Uchimura, Toyota (JP); Takehisa Tsubokawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 216 days.

(21) Appl. No.: 13/056,456

(22) PCT Filed: Jul. 21, 2009

(86) PCT No.: PCT/JP2009/063067
§ 371 (c)(1),
(2), (4) Date: Jan. 28, 2011

(87) PCT Pub. No.: WO2011/010367
PCT Pub. Date: Jan. 27, 2011

(65) Prior Publication Data
US 2011/0174562 A1    Jul. 21, 2011

(51) Int. Cl.
*B60K 15/00*    (2006.01)

(52) U.S. Cl.
USPC ............................................. 180/69.4

(58) Field of Classification Search
USPC ................ 180/69.4, 69.5; 903/944; 137/312, 137/551, 266, 267; 429/515; 73/40.7, 49.1
See application file for complete search history.

(56) References Cited

U.S. PATENT DOCUMENTS

| | | | | |
|---|---|---|---|---|
| 900,599 A * | 10/1908 | Setzer | .......................... | 137/207.5 |
| 932,284 A * | 8/1909 | Jones | .......................... | 137/207.5 |
| 1,582,855 A * | 4/1926 | Peter | .............................. | 222/62 |
| 2,189,448 A * | 2/1940 | Mccrory | ..................... | 137/207.5 |
| 2,327,373 A * | 8/1943 | Samiran | ........................... | 239/61 |
| 2,330,845 A * | 10/1943 | Samiran | .......................... | 222/26 |
| 2,535,094 A * | 12/1950 | Samiran | .................... | 137/101.27 |
| 2,966,921 A * | 1/1961 | Whiteman | ..................... | 137/122 |
| 3,120,326 A * | 2/1964 | Hedeman | ................... | 222/144.5 |
| 4,556,077 A * | 12/1985 | Peyton | ........................... | 137/112 |
| 4,773,255 A * | 9/1988 | Malcosky et al. | ............... | 73/40.7 |
| 5,813,429 A * | 9/1998 | Ohtaka et al. | ................. | 137/266 |
| 5,869,746 A * | 2/1999 | Watanabe et al. | .............. | 73/49.7 |
| 5,992,219 A * | 11/1999 | Otaka | ......................... | 73/40.5 R |
| 6,708,718 B2 * | 3/2004 | Yamada et al. | ................ | 137/255 |
| 7,168,415 B2 * | 1/2007 | Studebaker et al. | .......... | 123/509 |
| 2009/0242046 A1 * | 10/2009 | Riordon | ......................... | 137/512 |

FOREIGN PATENT DOCUMENTS

| | | |
|---|---|---|
| JP | 2002-115798 A | 4/2002 |
| JP | 2002-372197 A | 12/2002 |
| JP | 2004-161055 A | 6/2004 |
| JP | 2006-298371 A | 11/2006 |
| JP | 2007-170443 A | 7/2007 |
| JP | 2008-223784 A | 9/2008 |
| JP | 2009-021150 A | 1/2009 |

* cited by examiner

*Primary Examiner* — J. Allen Shriver, II
*Assistant Examiner* — James Triggs
(74) *Attorney, Agent, or Firm* — Kenyon & Kenyon LLP

(57) ABSTRACT

This invention provides a fuel system and a vehicle that can improve the ease of leak checking. The fuel system includes: a plurality of fuel storages; filling piping that connects the fuel storages to a filling port in parallel; and supply piping that connects the fuel storages to a fuel supply destination in parallel. An integral manifold is formed by integrating a filling manifold part disposed at a branching point of pipes of the filling piping and a supply manifold part disposed at a branching point of pipes of the supply piping with each other. The integral manifold has a leak checking port configured to allow introduction of a fluid for leak checking into the filling piping and the supply piping.

7 Claims, 9 Drawing Sheets

FUEL SYSTEM AND VEHICLE

This is a 371 national phase application of PCT/JP2009/063067 filed 21 Jul. 2009, the content of which is incorporated herein by reference.

TECHNICAL FIELD

The present invention relates to a fuel system comprising a plurality of fuel storages, filling piping that connects the fuel storages to a filling port in parallel, and supply piping that connects the fuel storages to a fuel supply destination in parallel. The present invention also relates to a vehicle having the fuel system.

BACKGROUND ART

A known fuel system of this type has four hydrogen tanks connected in parallel to a filling port by filling piping and to a fuel cell by supply piping (see Patent Document 1). The filling piping which connects the filling port to the hydrogen tanks comprises a single inlet pipe and four branch outlet pipes. The supply piping which connects the hydrogen tanks to the fuel cell comprises four inlet pipes and a single merged outlet pipe.

Inspecting for hydrogen leakage from the branching or merging part of the pipes, from the pipes themselves or the like, that is, leak checking, is essential for the fuel cell system. The system described in Patent Document 1 introduces an inert gas through the filling port to perform leak checking of the filling piping. The system also introduces an inert gas through a leak checking point (valve) provided on the supply piping to perform leak checking of the supply piping.

CITATION LIST

Patent Literature

Patent Literature 1 Japanese Patent Laid-Open No. 2002-372197 (FIG. 1 and paragraphs 0022 to 0025)

SUMMARY OF THE INVENTION

Problems to be Solved by the Invention

According to the leak checking method described above, however, the inert gas has to be separately introduced into the filling piping and the supply piping. Therefore, the method requires at least two leak checking operations and thus is inefficient. In order to introduce a sufficient amount of inert gas at one time, the inert gas has to be temporarily introduced into the hydrogen tanks through the filling piping and then discharged into the supply piping from the hydrogen tanks. Thus, this leak checking requires a large amount of inert gas and takes a long time.

An object of the present invention is to provide a fuel system and a vehicle that can improve the ease of leak checking.

Means for Solving the Problems

In order to attain the object, a fuel system according to the present invention comprises a plurality of fuel storages, filling piping that connects the fuel storages to a filling port in parallel, supply piping that connects the fuel storages to a fuel supply destination in parallel, and an integral manifold, which is formed by integrating a filling manifold part disposed at a branching point of pipes of the filling piping and a supply manifold part disposed at a branching point of pipes of the supply piping with each other. The integral manifold has a leak checking port configured to allow introduction of a fluid for leak checking into the filling piping and the supply piping.

According to the present invention, the integral manifold allows simultaneous introduction of the fluid for leak checking into the filling piping and the supply piping, and thus, the fluid for leak checking does not have to be introduced separately into the filling piping and the supply piping for leak checking. Therefore, the number of steps involved in leak checking can be reduced. In addition, leak checking can be performed without introducing the fluid for leak checking into the fuel storages. In addition, since the filling manifold part and the supply manifold part are integrated, more components can be shared or downsized than in the case of using separate manifold parts, and thus, the ease of assembly of piping is improved, and the piping arrangement is simplified.

Preferably, the filling piping may have a common filling pipe that extends from the filling port to the filling manifold part and a plurality of separate filling pipes that extend from the filling manifold part to the respective associated fuel storages. Preferably, the supply piping may have a common supply pipe that extends from the fuel supply destination to the supply manifold part and a plurality of separate supply pipes that extend from the supply manifold part to the respective associated fuel storages.

More preferably, the integral manifold may have a filling flow channel connected to the common filling pipe and the separate filling pipes; a supply flow channel connected to the common supply pipe and the separate supply pipes; a communication flow channel that connects the filling flow channel and the supply flow channel to each other; and a valve that opens and closes the communication flow channel. Preferably, the fluid may be introduced into the filling flow channel and the supply flow channel at the same time from the leak checking port when the valve is opened.

With this configuration, when leak checking is performed, the fluid for leak checking is introduced into the common and separate filling and supply pipes through the filling flow channel and the supply flow channel by opening the valve. On the other hand, when leak checking is not required (in normal operation, for example), the filling piping and the supply piping can be disconnected from each other by closing the valve.

More preferably, the leak checking port may be formed on the valve.

With this configuration, the leak checking port can be provided by advantageously using the valve, and the number of components can be reduced.

More preferably, the valve may be a manual valve having a manual operation part, and the leak checking port may be formed on the manual operation part.

With this configuration, the valve can be downsized compared with an electromagnetic valve, and the components used for operations involved in leak checking (operation for connecting an external device to the leak checking port or opening the valve) can be put together, so that the space required for those operations can be reduced.

According to a preferred aspect of the present invention, the filling manifold part and the supply manifold part may be positioned adjacent to each other in the integral manifold.

With this configuration, the ease of assembly of the piping to the filling manifold part and the supply manifold part can be improved.

According to a preferred aspect of the present invention, preferably, the fuel storages may be high-pressure tanks storing a fuel gas, and the fuel supply destination is a fuel cell.

A vehicle according to the present invention is a vehicle having the fuel system according to the present invention described above, in which the integral manifold is disposed between the plurality of fuel storages.

With the vehicle thus configured, a piping layout is simplified, and clearance between the fuel system and other components can be easily maintained.

Preferably, the vehicle may have two cross members disposed between the plurality of fuel storages. Preferably, the integral manifold may be attached to one of the cross members, and a regulator provided on the supply piping may be attached to the other of the cross members.

With this configuration, compared with the case where the integral manifold and the regulator are attached to one cross member, components can be easily spaced apart from each other, and the ease of assembly can be improved.

EMBODIMENTS FOR CARRYING OUT THE INVENTION

In the following, a fuel system and a vehicle according to preferred embodiments of the present invention will be described with reference to the accompanying drawings. As an example of the fuel system, a fuel cell system will be described below. The fuel cell system can be mounted on a vehicle, such as a fuel cell hybrid vehicle (FCHV), an electric vehicle and a hybrid vehicle. However, the fuel cell system can also be applied to various mobile bodies other than vehicles (such as ships, aircraft and robots) or a stationary power supply.

Figure 1:
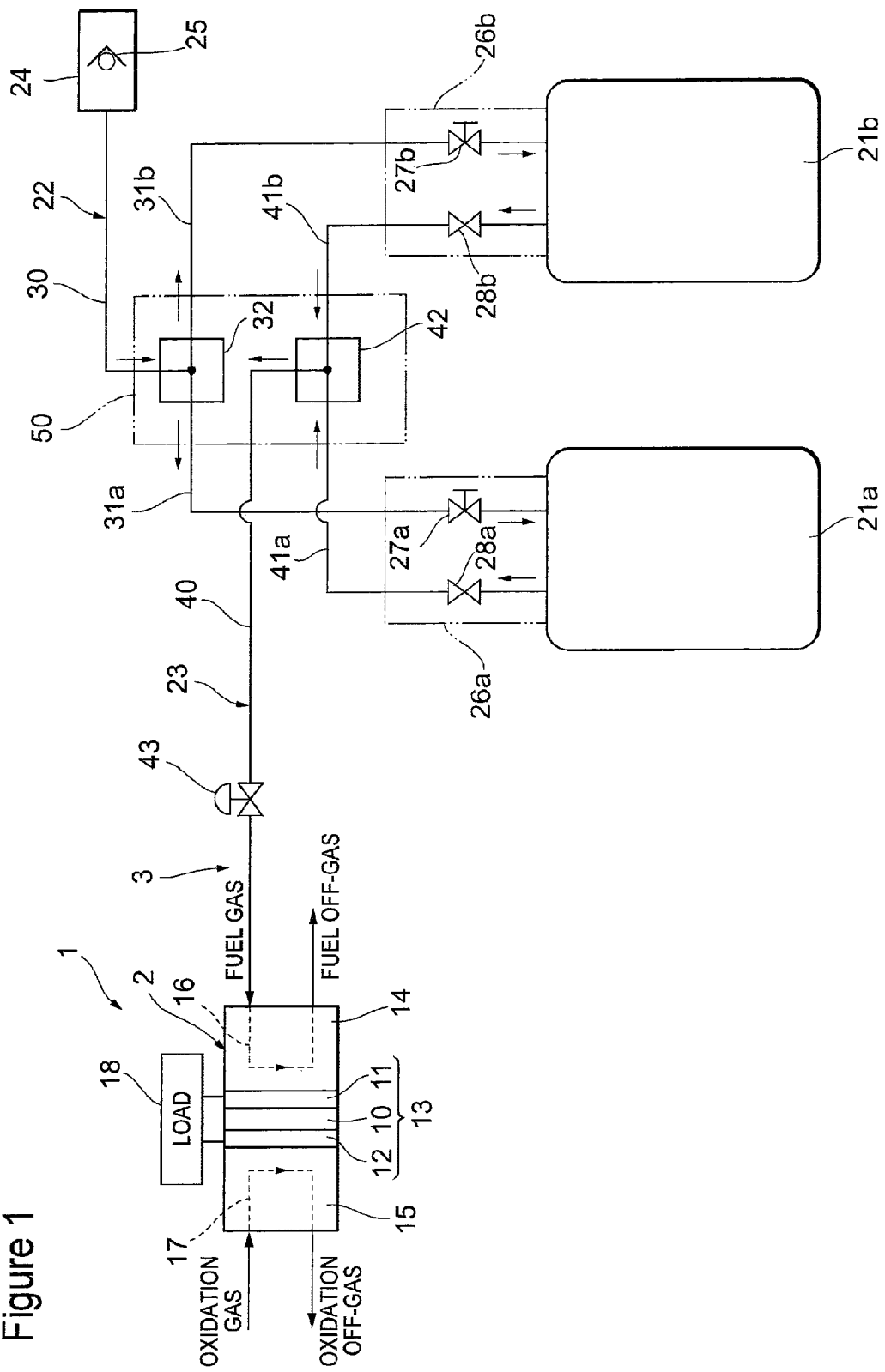
FIG. 1 is a diagram showing a configuration of a fuel system according to an embodiment.

As shown in FIG. 1, a fuel cell system 1 comprises a fuel cell 2, a fuel gas system 3 and an oxidation gas system. A fuel gas and an oxidation gas are collectively referred to as a reactant gas. The fuel gas is hydrogen gas, and the oxidation gas is air, for example.

The fuel cell 2 is of the solid polymer electrolyte type and has a stack structure in which a large number of unit cells are stacked. For the convenience of explanation, FIG. 1 schematically shows the structure of the unit cells of the fuel cell 2. The unit cell has a membrane electrode assembly (MEA) comprising an electrolyte membrane 10, a fuel electrode 11 and an air electrode 12. The electrolyte membrane 10 is an ion exchange membrane made of a fluorine-based resin, for example. The fuel electrode 11 and the air electrode 12 are disposed on the opposite surfaces of the electrolyte membrane 10. The unit cell has a pair of separators 14 and 15 abutting on the fuel electrode 11 and the air electrode 12, respectively. The fuel cell 2 generates an electric power by an electrochemical reaction between the fuel gas supplied into a fuel gas flow channel 16 of the separator 14 and the oxidation gas supplied into an oxidation gas flow channel 17 of the separator 15. The electric power generated by the fuel cell 2 is supplied to a load 18, such as a traction motor.

The fuel gas system 3 comprises two fuel tanks 21a and 21b, filling piping 22 having a single inlet pipe and a plurality of branch outlet pipes, and supply piping 23 having a plurality of inlet pipes and a single merged outlet pipe. The fuel tanks 21a and 21b may be a high-pressure tank that stores high pressure hydrogen gas or a hydrogen occlusion tank that stores a hydrogen absorbing alloy capable of reversibly occluding or discharging hydrogen. In the case of the high-pressure tank, the high-pressure tank stores hydrogen gas at 35 MPa or 70 MPa, for example. The number of fuel tanks has to be equal to or more than 2, and thus, four fuel tanks can be used, for example. Although not shown, the fuel off-gas discharged from the fuel cell 2 can be introduced into the supply piping 23 and circulated to the fuel cell 2.

The fuel tanks 21a and 21b are connected in parallel to a filling port 24 via the filling piping 22 and connected in parallel to the fuel cell 2, which is a fuel supply destination, via the supply piping 23. The filling port 24 is connected to a filling nozzle of a fuel gas filling apparatus (a fuel gas station, for example) for fuel gas filling. The filling port 24 has a control valve 25, which prevents the fuel gas flowing backward from being discharged to the outside through the filling port 24.

Valve assemblies 26a and 26b incorporating various types of valves, sensors and the like are screwed into the fuel tanks 21a and 21b, respectively. The fuel tanks 21a and 21b are filled with and discharge the fuel gas through the valve assemblies 26a and 26b. The valve assemblies 26a, 26b include manual valves 27a, 27b on a channel connected to the filling piping 22 and cut-off valves 28a, 28b on a channel connected to the supply piping 23. The cut-off valves 28a and 28b are electromagnetic cut-off valves, for example, and block the fuel gas discharged from the associated fuel tanks 21a and 21b. The valve assemblies 26a and 26b may incorporate a regulator or the like.

The filling piping 22 comprises a single common filling pipe 30 connected to the filling port 24 and two separate filling pipes 31a and 31b connected to the fuel tanks 21a and 21b. The filling piping 22 has a filling manifold part 32 connected to one ends of the pipes 30, 31a and 31b at the branching point of these pipes. The fuel gas supplied through the filling port 24 is distributed at the filling manifold part 32 to the fuel tanks 21a and 21b for filling.

The supply piping 23 comprises a single common supply pipe 40 connected to the fuel cell 2 and two separate supply pipes 41a and 41b connected to the fuel tanks 21a and 21b. The supply piping 23 has a supply manifold part 42 connected to one ends of the pipes 40, 41a and 41b at the branching point of these pipes. The fuel gas discharged from the fuel tank 21a and the fuel gas discharged from the fuel tank 21b are merged at the supply manifold part 42, and the merged fuel gas is adjusted in pressure by a regulator 43 disposed on the pipe 40 and then supplied to the fuel cell 2. If only one of the cut-off valves 28a and 28b is opened, the fuel gas is discharged from only one of the fuel tanks 21a and 21b, and therefore, the fuel gas is supplied to the fuel cell 2 without being merged with any other flow of fuel gas at the supply manifold part 42.

Figure 2:
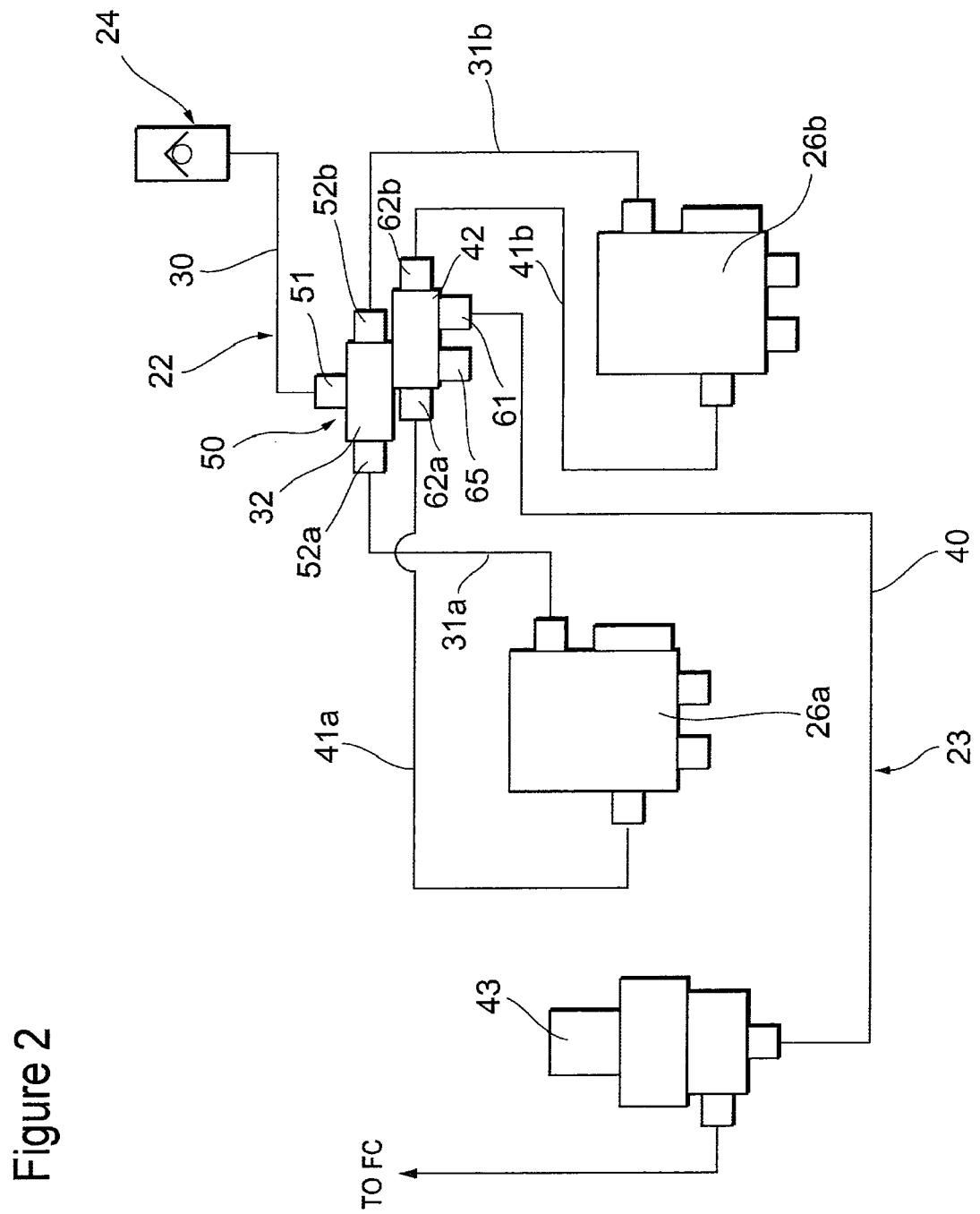
FIG. 2 is a diagram showing a configuration of an integral manifold and its surroundings in the fuel system shown in FIG. 1.

As shown in FIG. 2, the filling manifold part 32 and the supply manifold part 42 are integrated to form an integral manifold 50. In the integral manifold 50, the filling manifold part 32 and the supply manifold part 42 are disposed adjacent to each other. The integral manifold 50 has connection ports 51, 52a and 52b, to which the one ends of the pipes 30, 31a and 31b on the filling side are connected, and connection ports 61, 62a and 62b, to which the one ends of the pipes 40, 41a and 41b on the supply side are connected. The integral manifold 50 further has a leak checking port 65 used for leak checking.

Figure 3:
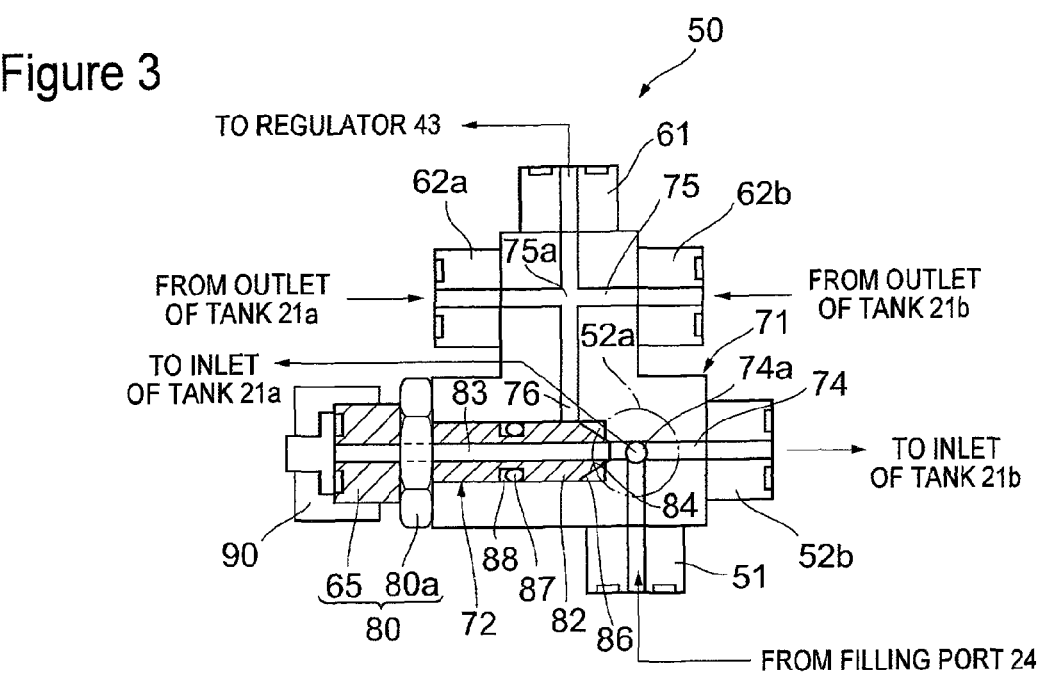
FIG. 3 is a cross-sectional view showing a configuration of the integral manifold shown in FIG. 2 in normal operation in which a valve is closed.
Figure 4:
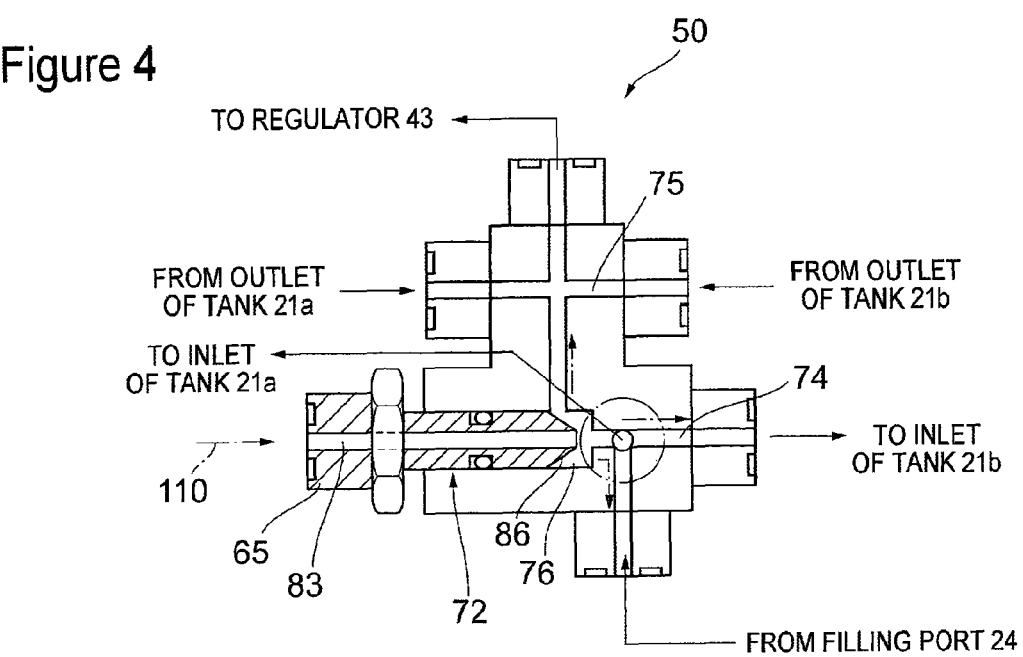
FIG. 4 is a cross-sectional view showing a configuration of the integral manifold shown in FIG. 2 in leak checking in which the valve is opened.

As shown in FIGS. 3 and 4, the integral manifold 50 comprises a manifold body 71 in which gas flow channels are formed and a valve 72 attached to the manifold body 71. The manifold body 71 is made of a hydrogen embrittlement resistant material (such as SUS316L), for example. The manifold body 71 has the connection ports 51, 52a and 52b on the filling side in the lower half part in the drawings and has the connection ports 61, 62a and 62b on the supply side in the upper half part in the drawings. Thus, in the integral manifold 50, the filling manifold part 32 and the supply manifold part 42 are adjacent to each other. The manifold body 71 further has the leak checking port 65 in the lower half part in the drawings at a position opposite to the connection port 52b on the filling side.

In the manifold body 71, a filling flow channel 74 connected to the pipes 30, 31a and 31b of the filling piping 22 and a supply flow channel 75 connected to the pipes 40, 41a and 41b of the supply piping 23 are formed. The filling flow channel 74 comprises three flow channels extending in three directions from a branching point 74a, the flow channel connected to the filling port 24 extends downward, the two flow channels connected to the tanks 21a and 21b extend in the same plane, one of the two flow channels extends vertically upward from the sheets of FIGS. 3 and 4, and the other extends rightward in the drawings. The supply flow channel 75 comprises three flow channels extending in three directions from a branching point 75a, the flow channel connected to the regulator 43 extends upward, and the two flow channels connected to the tanks 21a and 21b extend leftward and rightward in the same plane. With such configuration, the pipes (31a, 31b, 41a, 41b) extending from the tanks 21a and 21b and connected to the integral manifold 50 can be vertically separated into the filling side and the supply side and handled in the same plane. Thus, the ease of assembly of the piping can be improved.

In addition, a bypass flow channel 76 (a communication flow channel) that connects the branching point 74a of the filling flow channel 74 and the branching point 75a of the supply flow channel 75 to each other is formed in the manifold body 71. The bypass flow channel 76 is opened and closed by the valve 72. When the valve 72 is closed as shown in FIG. 3, the filling flow channel 74 and the supply flow channel 75 are isolated from each other. On the other hand, when the valve 72 is opened as shown in FIG. 4, the filling flow channel 74 and the supply flow channel 75 communicate with each other, and a fluid can flow between the flow channels.

The valve 72 is closed in normal operation (including the time of fuel gas filling and fuel gas supply) and opened primarily when leak checking is performed. The valve 72 is screwed into an opening of the manifold body 71 and can be moved forward or backward in the opening to close or open the bypass flow channel 76. The valve 72 may be any type of valve, such as a manual valve and an electrically-driven value (such as an electromagnetic valve and an electric valve). In this example, the valve 72 is a manual valve. In the case where the valve 72 is an electrically-driven valve, the valve may be either of the direct acting type and the pilot type.

The valve 72 has a manual operation part 80, a valve body 82 and a leak checking channel 83. The manual operation part 80 is a part exposed to the outside of the manifold body 71 when the valve is closed, and is composed of a hexagonal bolt top 80a and a leak checking port 65 fixed thereto. However, it is essential only that the manual operation part 80 enables the user to manually operate the valve 72, and thus, the structure of the manual operation part 80 is not limited to the structure described above. The manual operation part 80 is coupled to the valve body 82 and manually operated by the user to move the valve body 82 with respect to a valve seat 84 in the axial direction.

The valve body 82 closes the bypass flow channel 76 when the valve body 82 abuts against the valve seat 84, and the valve body 82 opens the bypass flow channel 76 when the valve body 82 is separated from the valve seat 84. The valve body 82 has a tapered sealing surface 86 at the axial tip end thereof as a part which comes into contact with the valve seat 84. The valve seat 84 is formed as a part of the manifold body 71. Alternatively, however, the valve seat 84 may be formed by a sealing member, such as a metallic seal, and the sealing member may be attached to the inside of the manifold body 71 at a predetermined position. An O-ring 87 and a back-up ring 88 are attached to the outer periphery of the valve body 82 at a middle position in the axial direction thereof, and the O-ring 87 prevents the fluid in the bypass flow channel 76 from flowing to the outside on the side of the manual operation part 80.

The leak checking channel 83 is formed to penetrate the center of the manual operation part 80 and the valve body 82 in the axial direction. The leak checking channel 83 is opened at the opposite ends thereof, and one of the open ends is formed in the flat surface of the tip end of the valve body 82 and opens into the bypass flow channel 76 when the valve 72 is opened. The other of the open ends is formed in the end surface of the leak checking port 65. The latter open end is closed by a plug 90 in normal operation. When leak checking is performed, the plug 90 is removed to open the open end to the outside, and a fluid for leak checking is externally introduced.

Figure 5:
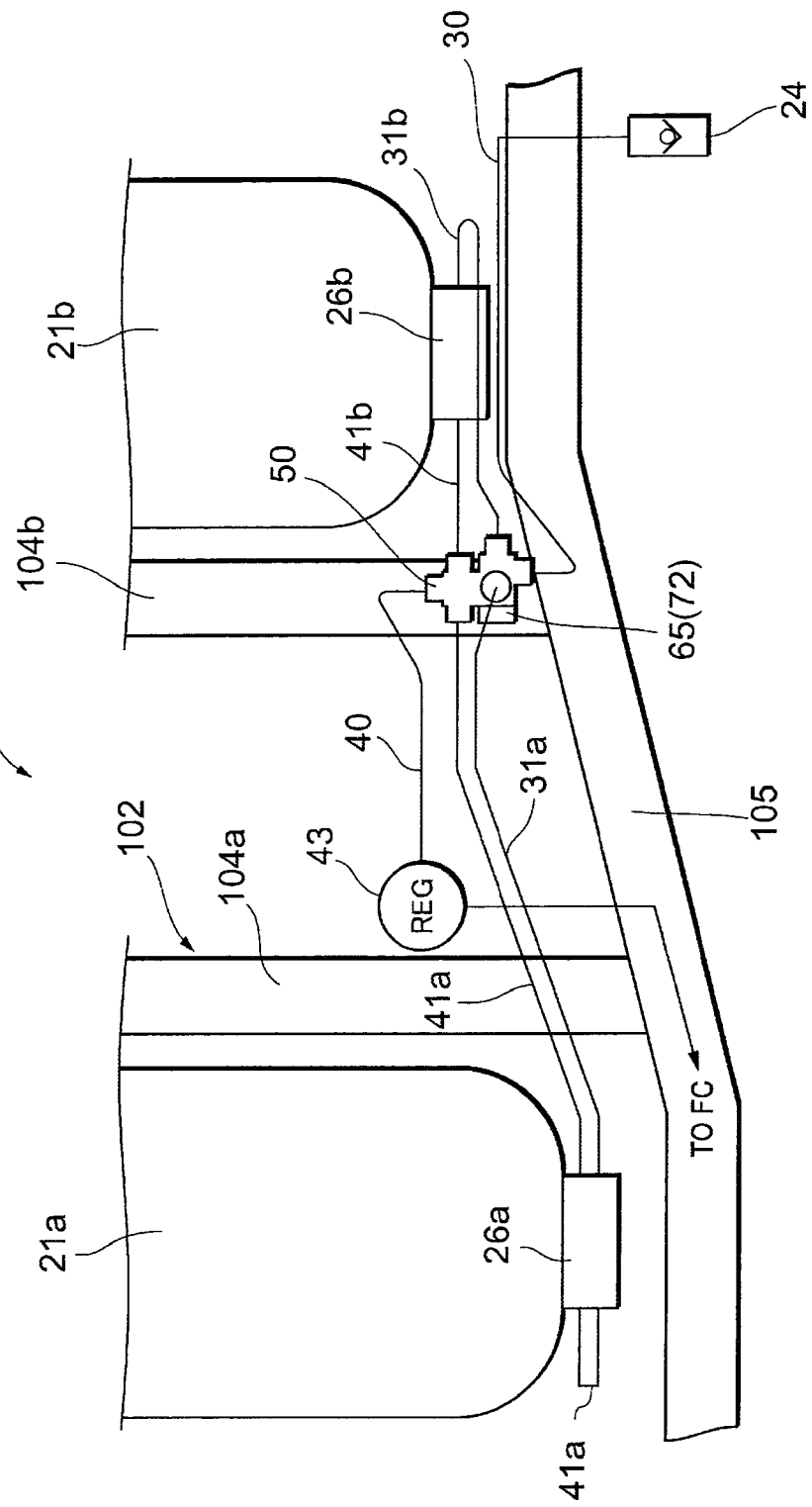
FIG. 5 is a diagram showing a part of a vehicle having the fuel system shown in FIG. 1.

FIG. 5 is a plan view showing an exemplary arrangement of the fuel gas system 3 and its surroundings in a vehicle 100 having the fuel cell system 1.

For example, in the case where the vehicle 100 is a kind of an ordinary vehicle, the filling port 24 is disposed on the rear side of the vehicle body, and the fuel tanks 21a and 21b are mounted and fixed at a lower part on the rear side of the vehicle body. A body frame 102 of the vehicle body comprises two cross members 104a and 104b extending in the lateral direction of the vehicle and a side member 105 extending in the longitudinal direction of the vehicle. The side member 105 cooperates with another side member (not shown) to support the ends of the cross members 104a and 104b. In a front part of the vehicle body, not only various components of the fuel cell system 1 (such as the fuel cell 2) but also a traction motor (load 18) that generates an impelling force for the vehicle 100, a power controlling unit and the like are disposed.

The fuel tanks 21a and 21b are mounted side by side in the longitudinal direction of the vehicle in the horizontal position with the valve assemblies 26a and 26b disposed on the same side as the filling port 24. The fuel tanks 21a and 21b are fixed to the body frame 102 at a position inside the side member 105 using a bracket or pedestal (not shown). The cross members 104a and 104b are located between the fuel tanks 21a and 21b. The regulator 43 is attached to the cross member 104a, and the integral manifold 50 is attached to the cross member 104b. The valve 72 of the integral manifold 50 is positioned in such a manner that the leak checking port 65 faces the cross member 104a while leaving a space between the leak checking port 65 and the cross member 104a to allow access to the manual operation part 80 (leak checking port 65).

Figure 6:
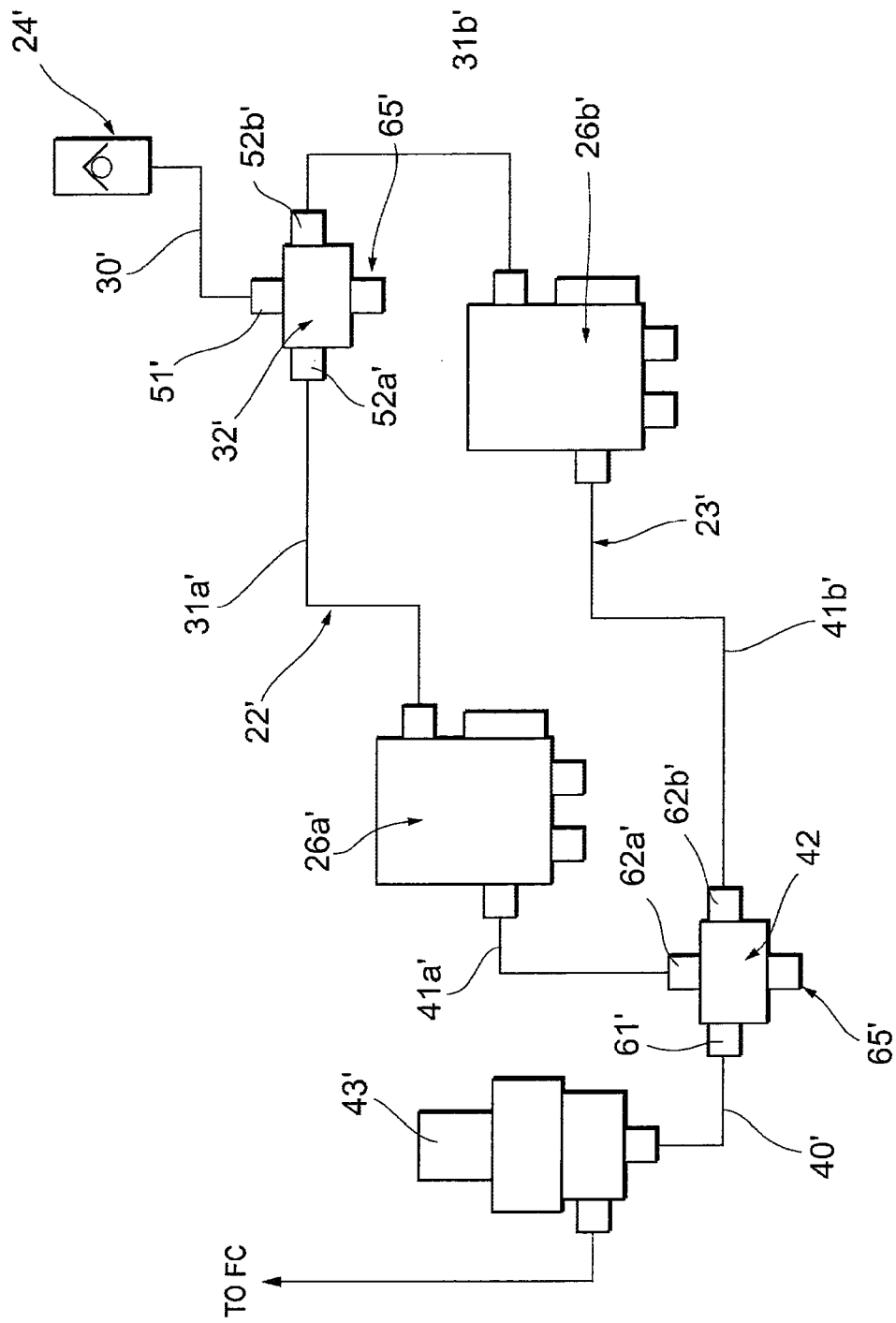
FIG. 6 is a diagram showing a configuration of a fuel system according to a comparative example.
Figure 7:
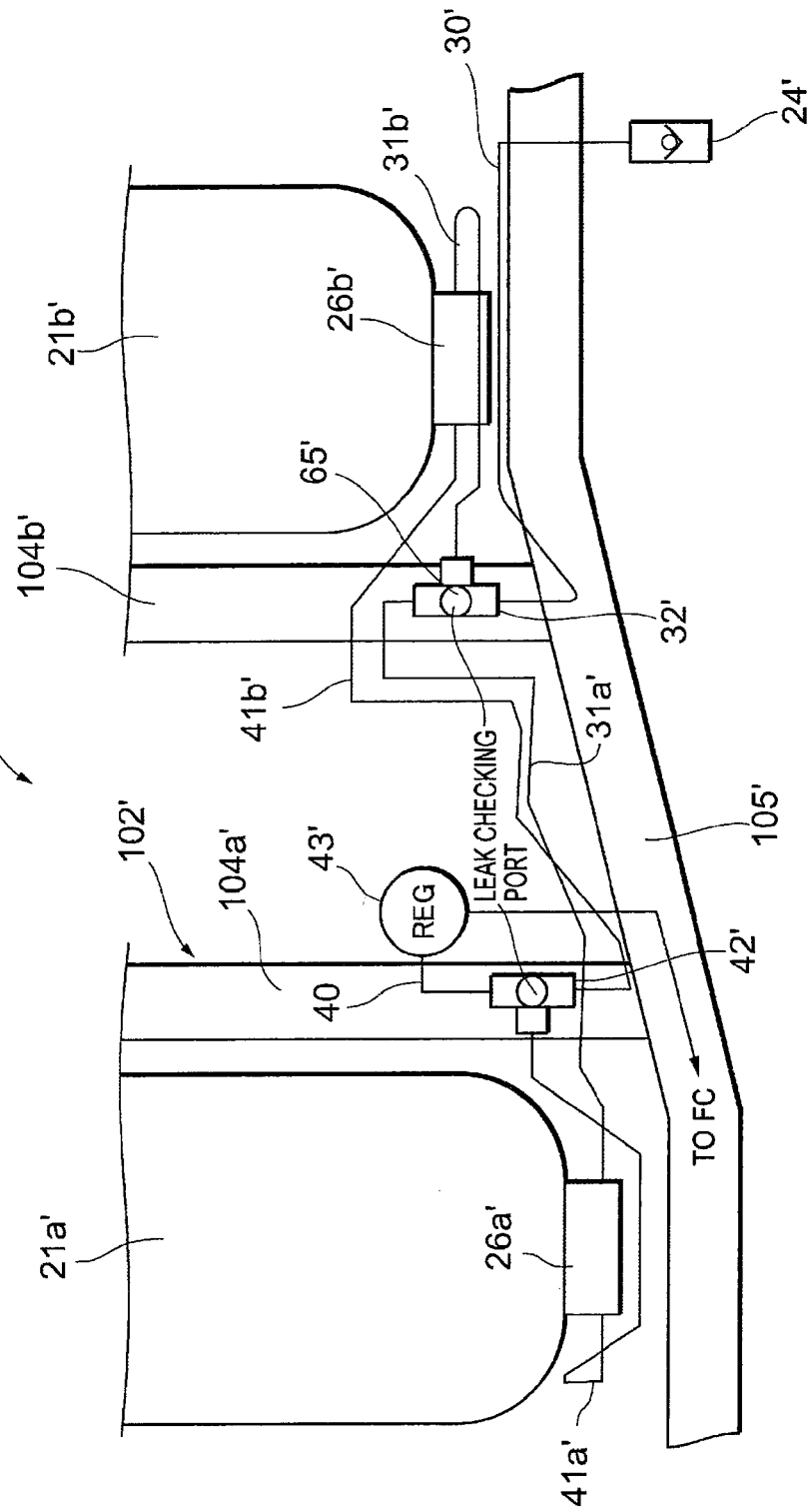
FIG. 7 is a diagram showing a part of a vehicle having the fuel system shown in FIG. 6.

Next, advantages of this embodiment will be described from the viewpoint of leak checking and ease of assembly of piping. First, a comparative example shown in FIGS. 6 and 7 will be described. In FIGS. 6 and 7, components identical or similar to those in this embodiment are denoted by the same reference numerals with a single quote mark "'". The comparative example differs from this embodiment in that the manifold parts are not integrated, in that each manifold part has a leak checking port, and in the position of the manifold in the vehicle.

Specifically, as shown in FIG. 6, a filling manifold part 32' and a supply manifold part 42' are not integrated. In addition, the filling manifold part 32' and the supply manifold part 42' each have a leak checking port 65'. In addition, as shown in FIG. 7, the filling manifold part 32' is attached to a cross member 104b', and the supply manifold part 42' is attached to a cross member 104a'.

1. Leak Checking

Leak checking of the fuel gas system is performed in order to check the sealing of a coupling after assembly of piping. In leak checking, a fluid for leak checking is supplied into the fuel gas system at a high pressure (5 to 80 MPa, for example), and a detector is brought close to a part to be checked for leakage to check whether the fluid leaks or not. The fluid for leak checking is preferably gas and can be an inert gas, such as helium. In the following description, the fluid for leak checking will be referred to as a leak checking gas. The concept of introducing the fluid for leak checking includes a concept of introducing a pressure for leak checking.

In the configuration of the comparative example shown in FIG. 6, leak checking is performed separately for the filling side and the supply side. Specifically, first, the leak checking gas is introduced into the filling manifold part 32' through the leak checking port 65' to detect whether or not the gas leaks from couplings (51', 52a', 52b') of the filling manifold part 32'. In this step, manual valves 27a', 27b' of valve assemblies 26a', 26b' are closed. Then, the leak checking gas is introduced into the supply manifold part 42' through the leak checking port 65' to detect whether or not the gas leaks from couplings (61', 62a', 62b') of the supply manifold part 42'. In this step, cut-off valves 28a', 28b' of the valve assemblies 26a', 26b' are closed.

To the contrary, according to this embodiment, leak checking for the filling side and the supply side can be performed at the same time. Specifically, first, the manual valves 27a', 27b' and the cut-off valves 28a', 28b' of the valve assemblies 26a', 26b' shown in FIG. 2 are closed to isolate the space in the fuel tanks 21a, 21b from the other spaces in the fuel gas system 3. Then, the valve 72 is opened as shown in FIG. 4 to establish communication between the filling system (the filling piping 22 and the filling flow channel 74) and the supply system (the supply piping 23 and the supply flow channel 75). Then, a pipe for leak checking is connected to the leak checking port 65 to introduce the leak checking gas into the leak checking channel 83. Then, the leak checking gas flows as indicated by the arrow 110 shown by an alternate long and short dash line in FIG. 4 and is introduced into the filling system (the filling piping 22 and the filling flow channel 74) and the supply system (the supply piping 23 and the supply flow channel 75) at the same time.

Therefore, according to this embodiment, the presence or absence of gas leakage from all the couplings (51, 52a, 52b, 61, 62a, 62b) and the like of the filling manifold part 32 and the supply manifold part 42 can be detected. Therefore, compared with the comparative example in which the leak checking gas is repeatedly introduced, the number of steps involved in the leak checking can be substantially halved. In addition, according to this embodiment, before removal of the filling piping 22, the pressure in the filling piping 22 can be released into the supply piping 23 by opening the valve 72. Therefore, this embodiment is advantageous for the timing of maintenance of the vehicle, in particular, for the timing of removal of the filling piping 22.

2. Ease of Assembly of Piping

In the configuration of the comparative example shown in FIG. 7, the piping around the fuel tanks 21a', 21b' is complicated. This is because many pipes cross (intersect with) each other. For example, the pipe 31a' on the filling side intersects with the pipes 41a' and 41b' on the supply side. In addition, in the vicinity of the cross member 104a', piping components are concentrated, so that it is difficult to maintain clearances between the components. For example, it is difficult to maintain clearance for insertion of a tool for connecting the supply piping 23' to the supply manifold part 42'.

To the contrary, according to this embodiment, as show in FIG. 5, the pipe 31a on the filling side does not cross the pipes 41a and 41b on the supply side. The piping layout can be simplified in this way because the filling manifold part 32 and the supply manifold part 42 are integrated. In addition, by adopting the integral manifold 50, the number of attachments to the vehicle is reduced, so that the mounting space in the vehicle can be saved. In addition, the regulator 43 is attached to the cross member 104a, and the integral manifold 50 is attached to the cross member 104b. Thus, the regulator 43 and the integral manifold 50 can be readily spaced apart from each other, so that not only the ease of attachment of these components but also the ease of assembly of the filling piping 22 and the supply piping 23 to the integral manifold 50 are improved.

In particular, the positional relationship between the filling manifold part 32 and the supply manifold part 42 in the integral manifold 50 described above, more specifically, the positional relationship among the ports (51, 52a, 52b, 61, 62a, 62b, 65) of the integral manifold 50 provides improvement of the ease of assembly of the filling piping 22 and the supply piping 23. For example, as shown in FIG. 5, the leak checking port 65 can be positioned to face the relatively wide space between the fuel tanks 21a and 21b to improve the ease of connection of a pipe to the leak checking port 65.

Another Embodiment

Next, an integral manifold according to another embodiment will be described with reference to FIGS. 8 and 9. The following description will be primarily focused on the difference from the integral manifold according to the embodiment described above. The primary difference is that the leak checking port 65 and the leak checking channel 83 are not formed in the valve 72. In the following description and FIGS.

8 and 9, the same members as those according to the above-described embodiment shown in FIG. 2 and the like are denoted by the same reference numerals, and descriptions thereof will be omitted.

Figure 8:
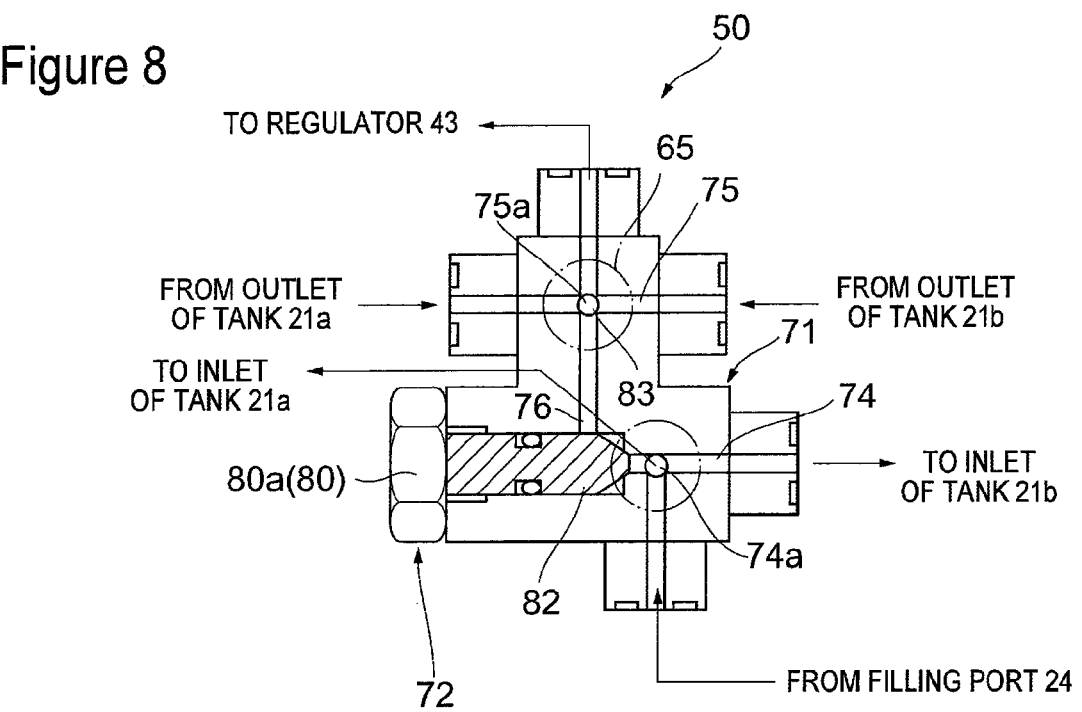
FIG. 8 is a cross-sectional view showing a configuration of an integral manifold of a fuel system according to another embodiment in normal operation in which a valve is closed.
Figure 9:
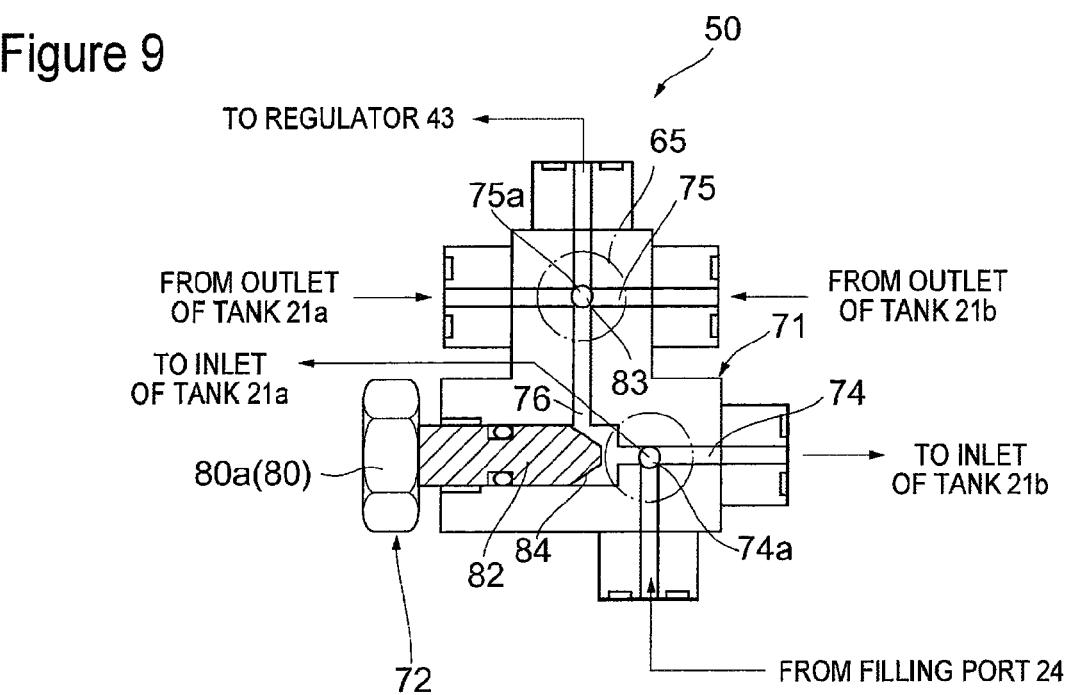
FIG. 9 is a cross-sectional view showing a configuration of the integral manifold of the fuel system according to the other embodiment in leak checking in which the valve is opened.

The leak checking port 65 is disposed in the upper half part of the manifold body 71 in the drawings and positioned in the same plane as the connection ports 62a, 62b on the supply side and extends upward from the sheets of FIGS. 8 and 9. The leak checking channel 83 is formed in the leak checking port 65 and the manifold body 71 and communicates with the branching point 75a of the supply flow channel 75 at one open end thereof.

According to this embodiment, as in the embodiment described above, the filling flow channel 74 and the supply flow channel 75 are isolated from each other when the valve 72 is closed, whereas the filling flow channel 74 and the supply flow channel 75 communicate with each other so that the fluid can flow therebetween when the valve 72 is opened. Therefore, this embodiment has the similar advantages as the embodiment described above.

INDUSTRIAL APPLICABILITY

The fuel system according to the present invention can be applied not only to the fuel cell system described above but also to a system that uses natural gas as fuel and a vehicle provided with the system.

REFERENCE SIGNS LIST 1 fuel cell system (fuel system)
2 fuel cell
21a, 21b fuel tank
22 filling piping
23 supply piping
24 filling port
30 common filling pipe
31a, 31b separate filling pipe
32 filling manifold part
40 common supply pipe
41a, 41b separate supply pipe
42 supply manifold part
43 regulator
50 integral manifold
65 leak checking port
72 valve
74 filling flow channel
75 supply flow channel
76 bypass flow channel (communication flow channel)
80 manual operation part
83 leak checking channel
100 vehicle
104a, 104b cross member

The invention claimed is:

1. A fuel system comprising a plurality of fuel storages; filling piping that connects the fuel storages in parallel to a filling port to be connected to a fuel gas filling apparatus; and supply piping that connects the fuel storages to a fuel supply destination in parallel, the fuel system further comprising:
   an integral manifold, which comprises a filling manifold part that is integrated with a supply manifold part,
      wherein the filling manifold part is at a branch point in the filling piping, and serves as the interconnection between a common filling pipe that extends from said filling port and a plurality of separate filling pipes that extend to the respective associated fuel storages; and the integral manifold further comprising a filling flow channel that connects said common filling pipe to said separate filling pipes;
      wherein the supply manifold part is at a branch point in the supply piping, and serves as the interconnection between a common supply pipe that extends from said fuel supply destination and a plurality of separate supply pipes that extend to the respective associated fuel storages; and the integral manifold further comprising a supply flow channel that connects said common supply pipe to said separate supply pipes;
   the integral manifold further comprising:
      a communication flow channel that connects said filling flow channel and said supply flow channel to each other;
      a valve for opening and closing said communication flow channel, and
      a leak checking port configured to allow introduction of a fluid for leak checking into said filling piping and said supply piping, and when fluid is introduced into said leak checking port with the valve opened, the fluid flows into said filling flow channel and said supply flow channel.

2. The fuel system according to claim 1, wherein said leak checking port is formed on said valve.

3. The fuel system according to claim 2, wherein said valve is a manual valve having a manual operation part, and said leak checking port is formed on said manual operation part.

4. The fuel system according to claim 1, wherein said filling manifold part and said supply manifold part are positioned adjacent to each other in said integral manifold.

5. The fuel system according to claim 1, wherein said fuel storages are high-pressure tanks storing a fuel gas, and said fuel supply destination is a fuel cell.

6. A vehicle having a fuel system according to claim 1, wherein said integral manifold is disposed between said plurality of fuel storages.

7. The vehicle according to claim 6, wherein the vehicle has two cross members disposed between said plurality of fuel storages,
   said integral manifold is attached to one of the cross members, and
   a regulator provided on said supply piping is attached to the other of the cross members.

* * * * *